Nov. 28, 1933.　　　　　E. PICK　　　　　1,937,325
AUTOMATIC REGENERATIVE WATER SOFTENER
Filed June 30, 1931　　　5 Sheets-Sheet 1

Fig. 1.

Inventor
Eric Pick,
By K. P. McElroy
His Attorney

Fig. 11.

Inventor
Eric Pick,
By K. P. McElroy
His Attorney

Nov. 28, 1933.    E. PICK    1,937,325
AUTOMATIC REGENERATIVE WATER SOFTENER
Filed June 30, 1931    5 Sheets-Sheet 5

Patented Nov. 28, 1933

1,937,325

UNITED STATES PATENT OFFICE 1,937,325

AUTOMATIC REGENERATIVE WATER SOFTENER

Eric Pick, New York, N. Y., assignor to The Permutit Company, New York, N. Y., a corporation of Delaware Application June 30, 1931. Serial No. 547,985

17 Claims. (Cl. 210—24)

This invention relates to automatic regenerative water softeners; and it comprises a simplified base exchange water softening apparatus provided with a softening tank, conduit connections to the top and to the bottom thereof and to a hard water supply line, to a soft water service line, to a waste or drain line and to a source of brine supply, with a multiway rotary slide valve common to all of said connections and adapted in being turned through four equal angles of a complete circle to connect the softening tank successively for a cycle of three regenerative operations with return to softening, said valve being advantageously attached to the top of the softening tank and being operable by an electric motor through the medium of a speed reducing mechanism and of an associated timing device comprising one or more starting switches, one of which may be automatically closed by a water meter, an electro-magnetic relay in the motor circuit energized by closing a starting switch, means automatically controlling the duration of the several regenerative operations and a circuit interrupter operated by said controlling means to open the relayed motor circuit upon completion of a cycle of operations; the whole assemblage constituting a simplified manually operable water softener adapted at once to either fully automatic or semi-automatic revivification of the water softening agent; all as more fully hereinafter set forth and as claimed.

In regenerative base exchange water softening various apparatus arrangements have been proposed with a view to making the mechanical operations involved more or less automatic, thereby minimizing the attention and manipulation required in operating water softeners. While some of these proposals possess features of merit in respect to their main object, it is still a matter of importance to simplify the mechanics of automatic water softening, and to improve upon prior proposed means of automatic operation. It is an object of the present invention to provide a simplified water softening apparatus and simple and economical means for automatic control of the various regenerative operations, requiring a minimum of attention in order to be continuously automatic in action.

It is another object of this invention to provide a new and improved multi-port valve for controlling the flows through the apparatus.

Softening may be by either upward or downward flow of water through a softening bed. With down-flow softening, revivification of a bed of water softening material such as base exchange silicates or zeolites after it has become exhausted in function involves usually three separate operations: (a) backwashing to rearrange the bed and to remove accumulations of extraneous matter; (b) regenerating as by a flow of brine to displace deposited hardness elements from the bed; and (c) rinsing out spent and surplus regenerating agent. While great frequency of backwashing is not always necessary, it is usually advantageous in down-flow water softening to make backwashing one of the regular operations of revivification. So doing, the operation of a softener may be said to be in a cycle of four phases corresponding to the three revivification operations just named and including the softening operation itself.

In another and copending application, Serial No. 484,164, filed Sept. 24, 1930, I describe and claim a simplified water softener adapted for automatic control of the revivification operations wherein change from each phase of an operating cycle to a succeeding phase is made by means of a single multiway valve with a rotary plug in a casing having a plurality of ports connected respectively to the top and to the bottom of a water softening tank, to a hard water supply line, to a soft water service line, to a waste or drain line, and to a brine line, the valve, in being turned through successive equal angles of a complete circle, making connections for the successive revivification operations and for return to softening. In the described apparatus, when desired, automatic operation and timing of said valve turns is by means of an electric motor with two speed reducing mechanisms directed to the valve stem, one of which turns the valve through successive equal angles at respective intervals of time predetermined by the other mechanism, the latter having a switch throwing attachment stopping the motor upon return of the valve to the softening position. Starting of the motor to initiate the revivification cycle may be by means of a switch in the motor circuit in series with the stopping switch and closed either manually or automatically as by means of a water meter, or of a clock or in other suitable ways.

In the present application I present new specific embodiments of the invention of said copending application. I provide new and improved means for conducting the cycle of revivification operations comprising a modified arrangement of connecting pipes with a correlated valve construction. For automatic meter-controlled operation of a softener by an electric motor I provide a relayed switching circuit affording a new positive control of the starting and stopping of the motor and thereby providing a combination which allows either semi-automatic or full automatic control in one apparatus.

In specific embodiments of my invention described in said copending application, the rotary multiway valve provides for three angular positions 120 degrees apart in which the connections are made for the four operations of softening, washing, brining and rinsing, one of the valve positions making the connections for both brining and rinsing, which two operations are further controlled by separate valve means in the brine line, brining being effected by means of an injector suitably placed in the multiway valve.

In the present invention I employ an arrangement of pipe connections with a common multiway rotary slide-valve having four angular positions 90 degrees apart making the respective connections for the four operating phases, no valve being required in the brine line in order to make the change from regenerating to rinsing. In automatic operation by an electric motor, this four position valve is conveniently turned through successive angles of 90 degrees through the medium of two gears, sprockets or the like, geared in a 1:4 ratio and the valve turns are conveniently timed by means of an intermittent gear with a connected lever engaging successively with four pins so arranged on a timing wheel moved at a suitable speed by the motor that the intermittent gear is put into action at predetermined time intervals to operate the 1:4 gearing which turns the valve; each revolution of the intermittent gear turning the valve through one quarter of a revolution. In electrical control of the starting and stopping of the motor to carry out the cycle of revivification and return to softening, I find it advantageous in many cases to place in the motor circuit an electromagnetic relay switch energized by a separate starting switch circuit to close the motor switch and to hold it closed until the relay circuit is momentarily broken by a normally closed interruptor actuated by the motor-moved timing wheel to open the circuit and stop the motor after the valve has been turned to its softening position to complete the four operation cycle. With such an arrangement the starting switch may be a simple push button manually and momentarily closed to energize the relay and then remaining open. This provides for what is known as semi-automatic control in which revivification is started at the pleasure of an operator and the several revivification operations are automatically timed and the return to softening is automatically controlled. Starting also may be automatically controlled by a water meter switch in circuit with the relay and arranged to be closed momentarily upon passage of a predetermined quantity of either hard water to the softener or softened water from the softener, thus providing for what is known as full automatic control. There may be one or more manual push button switches connected in parallel with the meter switch and placed at convenient points which may, if desired, be remote from the softener. By such an arrangement both full automatic and semi-automatic control are provided.

By means of a disengaging pawl attachment between the motor-driven gearing and the valve stem, as shown in detail in my above mentioned copending application, the valve becomes readily operable by hand in case of emergency and the one apparatus may constitute a manually operable water softener at once adapted to both semi-automatic and full automatic control.

In the brining or regenerating phase of operation, conveyance of brine to the bed of water softening agent may be by means of an injector suitably placed in the multiway valve and adapted to be actuated by a flow of water directed through the injector by suitable connections made by the valve in its regenerating position. Or, by a modified multiway valve arrangement associated with a closed brine tank and with both a water and a brine line between the valve and the brine tank, brine may be forced through the softening bed by pressure put upon the brine tank.

In the accompanying drawings I have shown, more or less diagrammatically, certain apparatus within my invention and having the described functional characteristics. In this showing:

Figs. 3 to 8 are detailed sectional views of the multiway valve of Fig. 1.

Figs. 12 to 17 are detailed sectional views of a modified multiway valve shown in Fig. 11.

Figure 1:
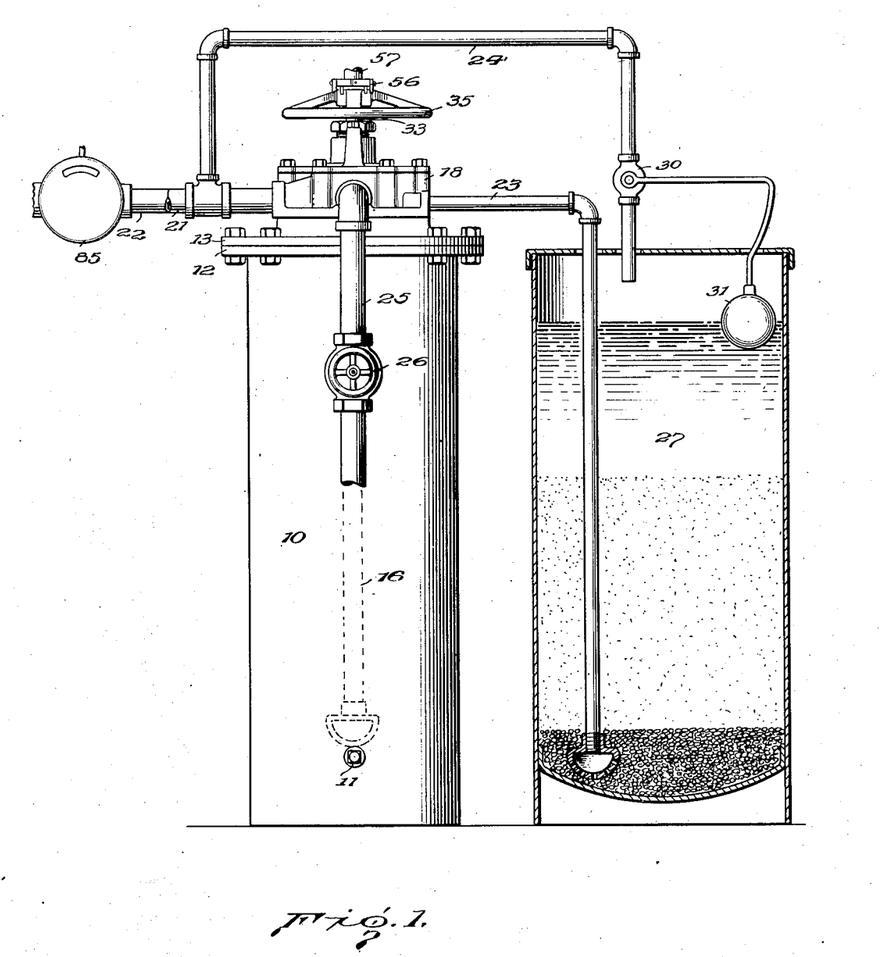
Fig. 1 is a view in elevation, partly in section, of a water softening apparatus including a brine tank and a manually operable multiway valve having an attachment for operation by a motor.

Referring first to Fig. 1, the structure 10 is a cylindrical water softening tank or zeolite chamber containing the usual bed of water softening material and having, as shown, a drain plug 11 and a top flange 12 to which is bolted a counterflange 13. The counterflange 13 forms a cover for the softening tank and has a central opening 14 (Figs. 3 and 4) communicating with the top of the softener and a side opening 15 communicating with the bottom of the softener through a pipe 16 joined to the counterflange at joint 17. Suitably attached to the counterflange top of the softening tank is a multiway rotary slide valve designated 18, having ports 14 and 15 communicating with the like designated openings in the counterflange. In the casing of valve 18 are other ports with connections as follows: hard water supply line 21, soft water service line 22, brine line 23 and a waste or drain line 25 provided with valve 26. The brine line 23 runs from a salt tank 27 which is supplied with water through a refill line 24 running from the hard water line 21 and provided with a valve 30, controlled by float 31 actuated by changes in the level of liquid in the salt tank. The valve 18 has a rotatable circular plug 32 with a stem 33 adapted by means of pins 33b to rotate the plug, the stem 33 being provided with a hand wheel 35.

All the valve ports are located in a circle around the body of the valve and with the exception of hard water port 21 the ports have openings into the bottom of the chamber containing the valve plug 32. Hard water port 21 communicates with a compartment 111 in the top part of the plug chamber above the plug. Between the plug and the port openings is placed a port plate 86 (with gasket 87) having openings therein communicating with the port openings as follows:

Openings 95, 96 and 97 communicate with top port 14;

Openings 98, 99 and 100 communicate with the bottom port 15;

Opening 101 communicates with soft water port 22;

Opening 102 communicates with the waste port 25;

Opening 103 communicates with the brine port 23;

Opening 104 and injector nozzle 90 communicate with a brine inlet port 91 formed in the body of the valve and communicating with an injector discharge passage 92 running through a fitting 92a and discharging into the top port 14.

Figure 3:
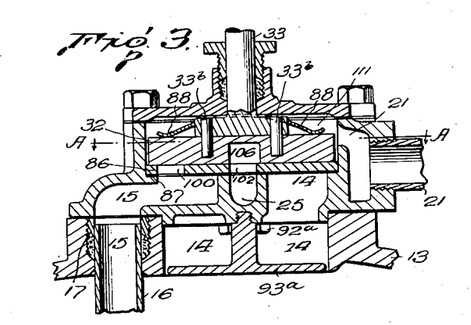
Fig. 3 showing a vertical section following the line B—B of Fig. 5.
Figure 4:
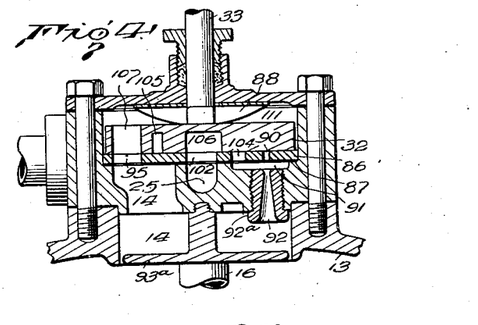
Fig. 4 being a vertical plane section on the line C—C of Fig. 5.

A fitting 93a attached to the bottom portion of the valve casing forms with the counterflange 13 a narrow annular opening which serves to distribute the water or brine respectively flowing from top port 14 into the water softening chamber 10. Plug 32 is held against the port plate 86 by a spring 88. As shown in Fig. 3, the hard water port 21 is in constant communication with the compartment 111 formed in the plug chamber above the plug 32.

The plug 32 is formed with two channels 105 and 106 in the bottom of the plug which are adapted to establish in rotation connection between different pairs of port plate openings. The plug 32 also has the four openings 107, 108, 109 and 110, running through the entire thickness of the plug and adapted to establish connection between the compartment 111 and various port plate openings as the plug is rotated.

Figure 5:
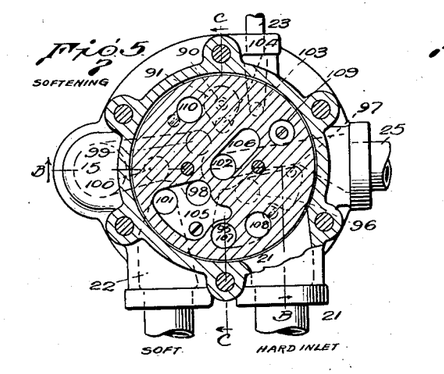
Figs. 5 to 8 being horizontal sections in the plane of the line A—A of Fig. 3 with the valve in four different positions.
Figure 6:
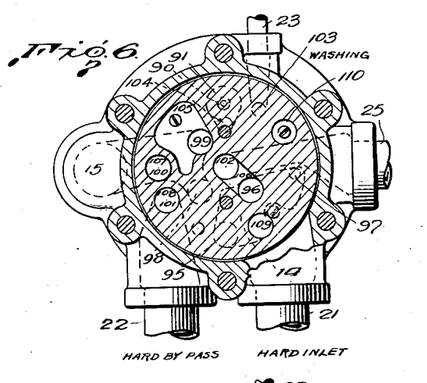
Figure 7:
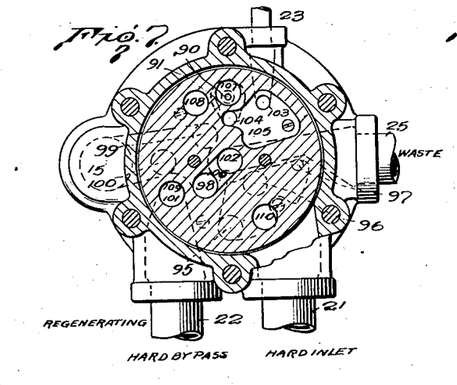
Figure 8:
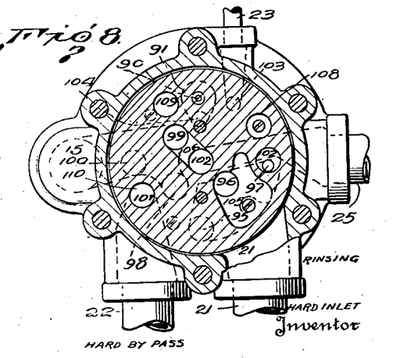

Operation of valve 18 is as follows: In the softening position (Fig. 5) hard water enters through port 21 and flows through compartment 111, plug opening 107 and port plate opening 95 to the top port 14, and the softened water flows from the bottom of the zeolite chamber through pipe 16, bottom port 15, plate opening 98, plug channel 105 and plate opening 101 to the soft water port 22. Backwashing (Fig. 6) is via port 21, compartment 111, plug opening 107, plate opening 100, bottom port 15 and pipe 16 to the zeolite chamber, then upwardly through the zeolite bed and out of the chamber via port 14, plate opening 96, plug channel 106, plate opening 102 and port 25 to waste. A bypass of hard water from compartment 111 to service is established during backwashing by plug opening 108 and plate opening 101. In the regenerating position (Fig. 7) water flows from compartment 111 via plug opening 109 and plate opening 101 forming a bypass to service and also via plug opening 107 to injector nozzle 90. The flow through the injector 92 draws brine from tank 27 through inlet 91, plate opening 104, channel 105, plate opening 103 and brine port and line 23. The injector discharge is through passage 92 and port 14 into the top of the zeolite chamber. The spent brine runs to waste from the bottom of the chamber through pipe 16, bottom port 15, plate opening 98, plug channel 106, plate opening 102 and waste port 25. In the rinsing position (Fig. 8) water is bypassed to service from compartment 111 through plug opening 110 and plate opening 101 and also flows through plug opening 107 and plate opening 97 to the top of the zeolite chamber. To obtain a more effective regeneration by rinsing out the brine at a low rate of flow the opening 97 may be made of such size as to throttle the flow of water and insure the most desirable rinse rate. The spent rinse water flows from the bottom of the chamber through pipe 16, bottom port 15, plate opening 99, channel 106, plate opening 102, and is discharged to waste from wate port 25.

In some cases a bypass of hard water to service during the regenerating cycle is not desired. The bypass is easily eliminated by omitting the openings 108, 109, and 110 from the plug 32.

As shown in Fig. 1, the brine pipe 23 is entirely unobstructed and the quantity of brine used in regeneration is controlled by the length of time the valve is kept in the regenerating position. A special feature of this design is that in turning from the regenerating position to the rinsing position the opening 107 passes over the opening 103, causing a flow of hard water through brine pipe 23 for a very short period of time. In this manner the brine pipe is flushed out by a back flow and cleared of any obstruction which may have become located in it. Since the regenerating operation is controlled by time only, the refill connection 24 running to the salt tank 27 may be connected to the hard water inlet 21 as shown in Fig. 1, or to the soft water outlet 22 if desired. In operation, salt tank 27 is automatically kept filled with water to a desired level by float valve 30 controlled by float 31.

Manual operation of the apparatus shown in Fig. 1 is readily possible. In that event refill line 24, valve 30 and float 31 may be omitted and the salt tank can be refilled with water by turning the plug 32 to such a position that communication is established from compartment 111 through plug opening 107 and plate opening 103 to port 23.

It is to be noted that the four valve positions of valve 18 as above described are 90° apart and that the cycle of revivification operations with return to softening is completed by turning the valve plug through a succession of four 90° angles or through a full circle.

Figures 2, 9, 10:
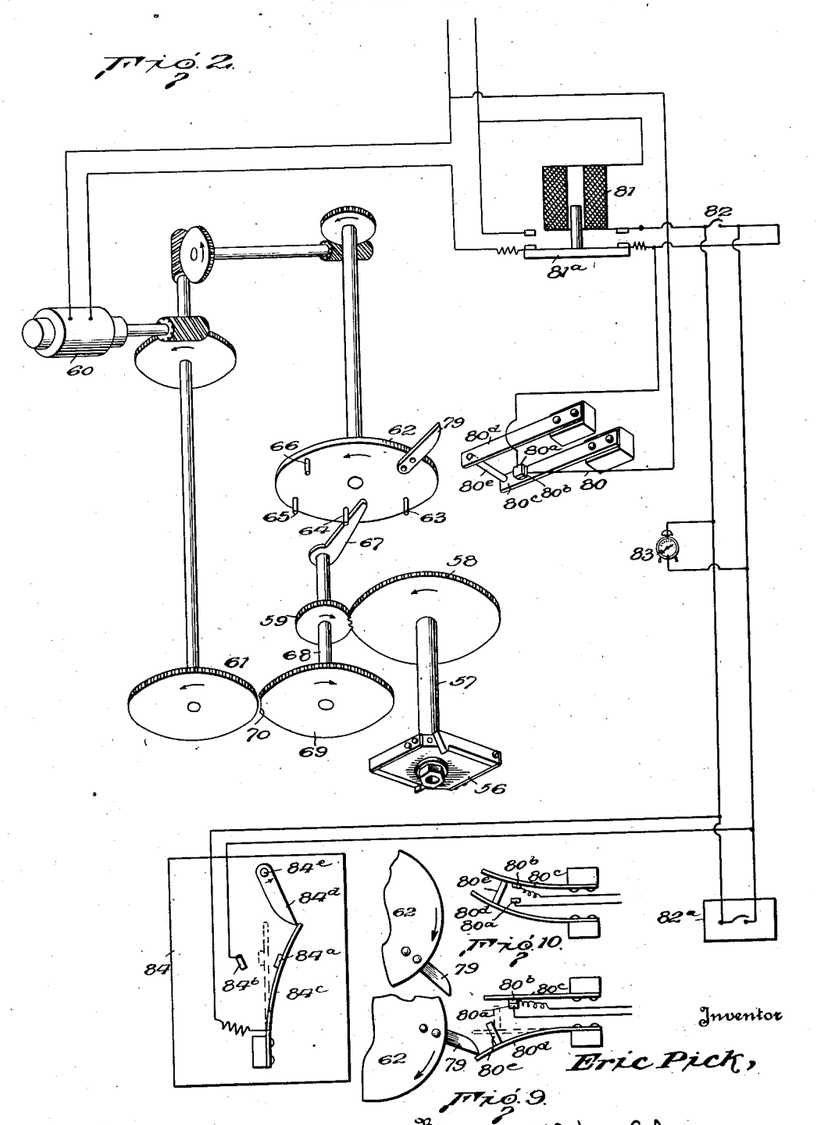
Fig. 2 is a diagrammatic view in elevation of a valve operating mechanism with an electric motor and with automatic electrical control.
Figs. 9 and 10 are diagrammatic details of a circuit interrupter shown in Fig. 2.

In automatic and semi-automatic control of the cycle of operations, the valve wheel 35 is fitted to a train of gears by means of a pawl and pin attachment 56 (Figs. 1 and 2). This attachment is described in detail in my before mentioned copending application Serial No. 484,164 and is so constructed that the attachment may be readily disengaged from the valve wheel by a manual turning of the valve. When engaged, the pawls and pines attach the valve wheel to a shaft 57 which is geared by gears 58 and 59 to a speed reducing driving and timing mechanism running to the shaft of an electric motor 60. As shown, the speed reducing driving and timing mechanism operates through a driving gear 61 and a timing wheel 62. Driving gear 61 operates in conjunction with a cut out driven gear 69, which is on a common shaft 68 with gear 59, and has a cut out portion 70 so arranged that after each revolution of the gear 69 this gear is automatically disengaged from gear 61. Gears 59 and 58 are in 1:4 ratio so that each revolution of gear 69 turns the gear 58 and thus the valve wheel and plug through one quarter of a revolution or through an angle of 90°. Timing of the engagement of gears 69 and 61 is effected by means of timing wheel or cam 62 which is provided with four timing pins 63, 64, 65 and 66, engaging successively as wheel 62 is turned by the motor 60 with a bar or lever 67 on the shaft 68. The pins 63, 64, 65 and 66 correspond respectively with the softening, backwashing, brining and rinsing positioning of the valve, and are so placed upon wheel 62 as to determine the respective intervals during which the valve remains in backwashing, brining, and rinsing positions. Upon wheel 62 is placed bar 79 in such a position that soon after pin 63 engages with lever 67 to cause a return of the valve from rinsing to softening position, this bar 79 operates an interruptor 80 in an electric circuit supplying motor 60 so arranged as to open the circuit and stop the motor, leaving the valve in the softening position.

To initiate the revivification cycle, the motor circuit may be closed in any one of a number of ways as desired. In any case it is advantageous to have in the power line an electromagnetic relay 81 adapted upon closing of its circuit to close a relay switch 81a and thus to close the motor circuit, starting the motor. Closing of the relay circuit may be by a near by push button switch 82 or a remote switch 82a. Or a clock-operated switch 83 may be utilized for closing the relay circuit at a desired time. In full automatic control a meter operated switch 84 may be inserted in the relay circuit in parallel with one or more manual switches. Advantageously, the meter or clock operated switch may be adapted to cause a momentary closing of the relay circuit by means of the terminals 84a and 84b, one of which is stationary and the other of which is attached to a spring 84c. Such a spring is shown in its normal open position by the dotted lines in the figure. It is actuated by a bar or pin 84d on a shaft 84e turned by a water meter (indicated at 85, Fig. 1) which may be inserted in either the hard water line 21 or the soft water line 22 of Fig. 1, and arranged to engage pin 84d with spring 84c after passage through the meter of a predetermined amount of water and thus after a certain amount of softening effected by the zeolite bed with its concomitant degree of exhaustion. Engagement of pin 84d with spring 84c puts a tension upon the spring and its rebound after its release by the pin causes a momentary contact of terminals 84a and 84b, thus closing the circuit of relay 81 and causing a closing of the relay switch 81a which starts the motor and short circuits the starting switches. In the relay circuit, as shown, is placed the momentary current interruptor 80. This interruptor is arranged to be normally closed. Its operation is illustrated in Figs. 9 and 10. One of its terminals 80a is stationary while the other terminal 80b is on a spring 80c normally holding the two terminals in contact. Another spring 80d is shown in its normal position in dotted lines. This spring is so placed with relation to wheel 62 that bar 79 engages the spring once in each rotation of wheel 62. This engagement puts a tension upon the spring 80d and upon release effected by passing of bar 79, a cross bar 80e impinges upon the spring 80c and momentarily breaks the contact between terminals 80a and 80b. This breaking of contact opens the relay circuit and switch 81a is released by the relay and breaks the motor circuit. The arrangement of the motor switch relay with relay circuit starting switches as described has the advantage of preventing the possibility of having the revivification cycle stopped by inadvertent or accidental shifting of a starting switch during revivification. Once started, the revivification cycle proceeds automatically to its conclusion, and thereafter the apparatus is ready for either automatic or manual restarting, as desired, by a momentary closing of a starting switch.

Figure 11:
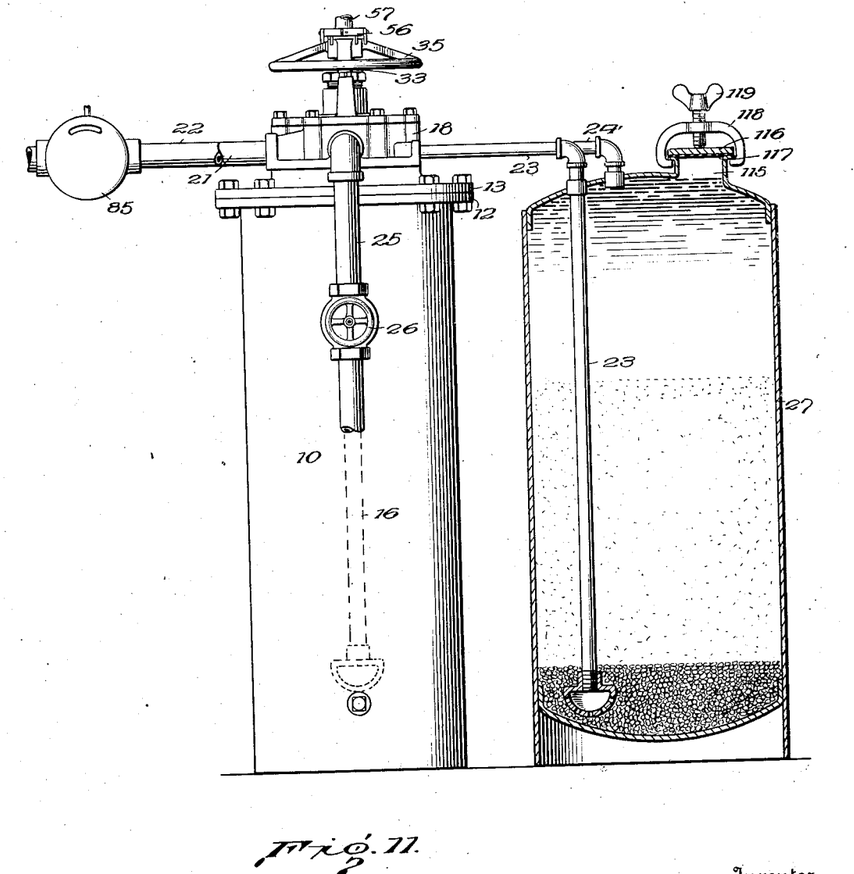
Fig. 11 is a view in elevation, partly in section, showing a modification of the water softening apparatus shown in Fig. 1.
Figure 12:
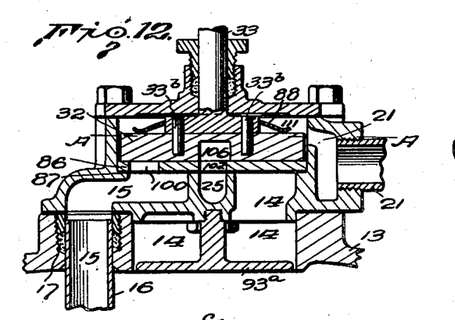
Fig. 12 showing a vertical section following the line B—B of Fig. 14.
Figure 13:
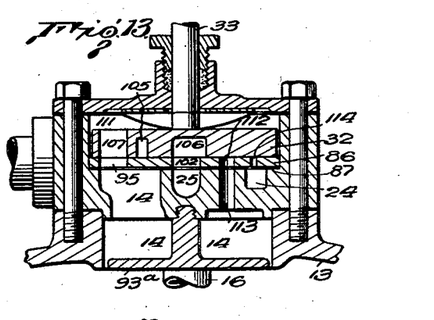
Fig. 13 being a vertical plane section on the line C—C of Fig. 14.
Figure 14:
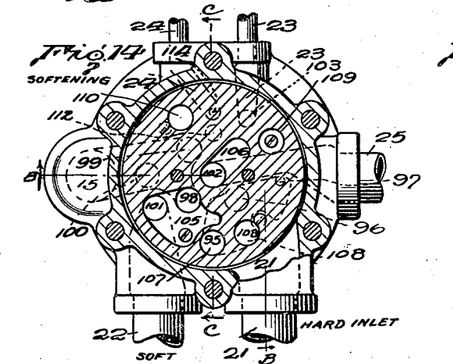
Figs. 14 to 17 being horizontal sections in the plane of the line A—A of Fig. 12 with the valve in four different positions.
Figure 15:
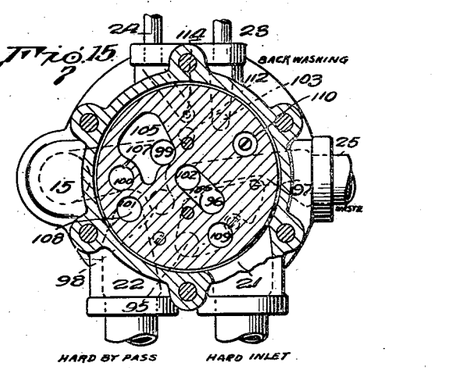
Figure 16:
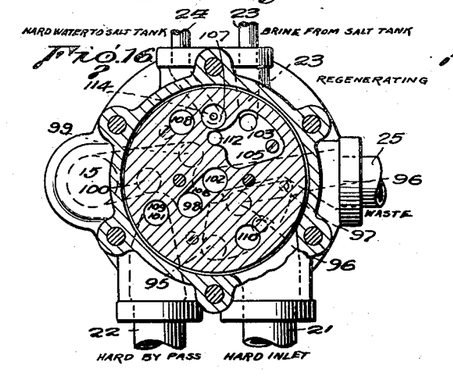

In Fig. 11 and in Figs. 12 to 17, I have shown a modification of my invention comprising a water softening apparatus having a brine tank operated under pressure and a modified valve adapted to such operation. In this modification the tank 27 has a closed top and the refill water line 24 runs from valve 18 through the closed top of tank 27. The salt is put into tank 27 from time to time when required through a flanged filling opening 115 which is sealed against pressure by means of cover 116 (with gasket 117) held by yoke 118 and screw 119.

Figure 17:
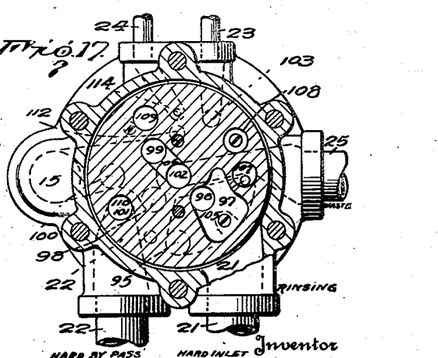

The modified valve is in general similar to that illustrated in Figs. 3 to 8 but it has in addition a refill port and connection 24 and an opening 114 in the plate 86 communicating with refill port 24. Plate 86 has an opening 112 in communication with a passage 113 in the body of the valve leading to the top port 14, plate opening 112 taking the place of opening 104 of the previously described valve. Injector nozzle 90, brine inlet 91, injector discharge passage 92 with fitting 92a are absent in the modified construction, being replaced by plate opening 114 and port 24. In operation of this modified valve, the softening position of Fig. 14, the backwashing position of Fig. 15, and the rinsing position of Fig. 17 provide the same conditions of flow through the valve as those hereinabove described in the valve of Figs. 3 to 8. In the regenerating position, however, of Fig. 16, water flows from compartment 111, which is in constant communication with hard water port 21, via plug opening 109 and plate opening 101 to soft water port 22, these openings forming a bypass of hard water to service. In this position water also flows from compartment 111 via plug opening 107 and plate opening 114 into refill port and connection 24 and thereby to the top of the salt tank 27. Brine flows under pressure from the bottom of the salt tank through the brine line and port 23, plate opening 103, plug channel 105, plate opening 112, and passage 113 to the top port 14. After passing through the zeolite bed, the spent brine runs from the bottom of the chamber through pipe 16, bottom port 15, plate opening 98, plug channel 106, plate opening 102 to waste through the waste port 25.

As in the previously described valve, bypass of hard water to service during the revivification cycle may be eliminated by omission of the openings 108, 109 and 110 from the valve plug 32. The opening 114 through which water runs to the salt tank is made of such size as to ensure the desired rate of flow of brine during regeneration. This brine rate control, together with a proper timing of the duration of the brining operation, determines the passage of an appropriate amount of brine for regeneration. This modified valve is adapted to automatic control of the cycle of revivification operations with return to softening in being turned through four equal angles of a complete circle as above described in connection with Figs. 2, 9 and 10.

While I have described my invention with respect to down flow softening with up flow backwashing and down flow regenerating and rinsing, it is noted that the invention is applicable, by suitable arrangement of the pipe connections and modifications of the multiway valve ports and plug openings, to up flow softening with any desired cycle or order of four phase operation.

What I claim is:—

1. In a regenerative base exchange water softening apparatus, a container for water-softening material, conduit connections to the bottom and to the top of said container, to a hard water line, to a soft water line, to a source of brine supply and to a waste line, a rotary multiway slide valve comprising a casing having therein a plurality of ports each connected to one of said conduit connections, a port plate with openings therein communicating with the ports, a central valve member rotatable upon the port plate and having passages formed therein adapted upon rotation of said member successively through four equal angles of a complete circle to connect said plate openings, ports and conduit connections for a succession of three different regenerative operations in said container with return to softening and a stem adapted to rotate said member.

2. In a regenerative base exchange water softening apparatus, a container for water-softening material, conduit connections to the bottom and to the top of said container, to a hard water line, to a soft water line, to a source of brine supply and to a waste line, a rotary multiway slide valve comprising a casing having therein a plurality of ports each communicating with one of said conduit connections, a port plate with openings therein communicating with the ports, a central valve member rotatable upon the port plate and having passages formed therein adapted upon rotation of said member successively through four equal angles of a complete circle to connect said plate openings, ports and conduit connections for four successive operations of said apparatus, an electric motor geared to said rotating member in a speed reducing gearing, an intermittent gear in said gearing associated with a driving gear and a driven gear of a 1:4 ratio whereby one revolution of the intermittent gear turns the valve member through a 90 degree angle, an auxiliary gearing actuated by the motor and a timing wheel in said auxiliary gearing adapted by means of four projections thereon and an engaging bar connected with the intermittent gear to effect enmeshment of the intermittent gear with the speed reducing gearing at predetermined successive intervals.

3. In a regenerative base exchange water softening apparatus, a container for water-softening material, conduit connections to the bottom and to the top of said container, to a hard water line, to a soft water line, to a source of brine supply and to a waste line, a rotary multiway slide valve comprising a casing having therein a plurality of ports each connected to one of said conduit connections, a port plate with openings therein communicating with the ports, a central valve member rotatable upon the port plate and having passages formed therein adapted upon rotation of said member successively through four equal angles of a complete circle to connect said plate openings, ports and conduit connections for four successive operations of said apparatus, an electric motor geared to said valve rotating member in a speed reducing gearing, an intermittent gear in said gearing associated with a driving gear and a driven gear of a 1:4 ratio whereby one revolution of the intermittent gear turns the valve member through a 90 degree angle, an auxiliary gearing actuated by the motor, a timing wheel in said auxiliary gearing adapted by means of four projections thereon and an engaging bar connected with the intermittent gear to effect enmeshment of the intermittent gear with the speed reducing gearing at predetermined successive intervals and automatic means operable by the auxiliary gearing for switching off the motor at the end of a cycle of operations.

4. In water treating apparatus adapted for manual or automatic operation, a rotary multiway valve controlling a plurality of liquid flows through the apparatus and comprising a casing, a plurality of ports in the casing, a stationary port plate having port openings therein and a rotatable circular member disposed within the casing in contact with the port plate, said ports, port plate and rotatable member being adapted to make successive connections for a cycle of four different operations in said apparatus upon rotation of said member through successive angles of 90 degrees in the same direction.

5. In automatic regenerative base exchange water softening apparatus, a bed of water softening material in a container connected at top and bottom to a multiway valve comprising a plurality of casing ports and a rotatable valve member having formed therein a plurality of passages, said plurality of casing ports being respectively connected to the top and to the bottom of the container, to a hard water supply, to a source of regenerating solution, to a service system and to a drain, said casing ports and passages in the valve member being adapted to connect the water softening bed successively for washing, regenerating, rinsing and softening as said valve member is rotated successively and in the same direction through four equal angles of a complete revolution, a rotary motor arranged to rotate continuously during said four successive operations and a gearing and a timing mechanism adapted to establish and disestablish operative connection at controlled time intervals between the motor and said rotatable valve member, said gearing including a set of gears having a driving member and a driven member geared in a 1:4 ratio so that each complete revolution of the driving member by the motor turns said valve member automatically through an angle of 90 degrees.

6. In an automatic regenerative base exchange water softening apparatus having valve mechanism operable by an electric motor to make the successive valve connections for a cycle of regenerative operations and return to softening, means for starting said cycle comprising a relay switch in circuit with the motor, an electromagnetic relay operating said switch, and a momentary starting switch in circuit with the relay, the starting switch being short circuited upon closing of the relay switch and the relay switch remaining energized upon opening of the starting switch.

7. In an automatic regenerative base exchange water softening apparatus having valve mechanism operable by an electric motor to make the successive connections for a cycle of regenerative operations with return to softening, means for controlling said cycle comprising a relay switch in the motor circuit, an electromagnetic relay operating said switch, a starting switch in circuit with the relay and short circuited by the relay switch and means for terminating said cycle comprising a circuit interruptor in series with the electro-magnetic relay, said interruptor comprising normally closed contacts with means operable by the motor for momentarily breaking said contacts.

8. In automatic regenerative base exchange water softening apparatus having valve mechanism operable by an electric motor and adapted to make successive valve connections for a cycle of regenerative operations with return to softening, an improved system of electrical control comprising a relay switch in the motor circuit, a starting switch for energizing the relay to close the motor circuit, said relay being adapted to remain energized upon opening of the starting switch, and a momentary circuit interruptor operable by the valve operating mechanism and adapted to deenergize said relay to open the motor circuit after the return to softening.

9. In fully automatic base exchange water softening apparatus having valve mechanism operable by an electric motor adapted to make successive valve connections for a cycle of regenerative operations with return to softening, an improved system of electrical control comprising a relay switch in the motor circuit, a water meter actuated by water flow through the apparatus, a momentary circuit closing switch operable by the water meter to energize the relay to start the motor, means in the relay to keep it energized after opening of the meter switch and a momentary circuit interruptor operable by the valve operating mechanism and adapted to deenergize said relay after the return to softening.

10. In a regenerative base exchange water softening apparatus, a container for water-softening material, conduit connections to the bottom and to the top of said container, to a hard water line, to a soft water line, to a source of brine supply and to a waste line, a rotary multiway slide valve comprising a casing having therein a plurality of ports each communicating with one of said conduit connections, a port plate with openings therein communicating with the ports, a central valve member rotatable upon the port plate and having passages formed therein adapted upon rotation of said member successively through four equal angles of a complete circle to connect said plate openings, ports and conduit connections for four successive operations of said apparatus and a gear train for rotating said valve member which comprises a pair of gears in a 1:4 ratio so connected to the valve member that a single revolution of one of said gears turns the valve member through a quarter of a revolution.

11. In zeolite water softening apparatus having a softening chamber and a source of brine supply, a multiway valve adapted to control the flow of liquid to and from the softening chamber, said valve comprising a casing having a plurality of ports connected respectively with top and bottom of the softening chamber, with a soft water service pipe, with the source of brine supply and with a waste pipe, a flat stationary port plate in the casing having openings communicating with said ports, one of said openings communicating with the port connected with the waste pipe being centrally located in the port plate and other openings being located on a circle concentric with said central opening, said valve casing having also a hard water supply port with a communicating compartment, a flat valve member rotatable on the port plate and located in said compartment, an opening extending through the full thickness of the valve member and adapted upon rotation of the latter to successively establish communication between the hard water supply compartment and the port plate openings located on a circle, and recessed passages formed on the flat side of the valve member in contact with the port plate, one of said passages extending radially from the center of the valve member and being adapted to connect the central port plate opening successively with other openings upon rotation of the valve member.

12. In apparatus as specified in claim 11, an opening formed in the port plate on said concentric circle to provide an injector inlet nozzle, an injector discharge nozzle coaxial with said inlet nozzle and arranged in the valve casing in communication with one of the softening chamber ports and a brine inlet passage formed in the casing and adapted to admit brine to the injector from the brine port, said injector inlet opening in the port plate being adapted to receive hard water through said valve member opening upon rotation of the valve member.

13. In zeolite water softening apparatus having a softening chamber and a source of brine supply, a multiway valve adapted to control the flow of liquid to and from the softening chamber, said valve comprising a casing having a plurality of ports connected respectively with top and bottom of the softening chamber, with a soft water service pipe, with a waste pipe and with a brine injector having its discharge connected to the softening chamber and being adapted upon flow of water therethrough to suck brine from the source of brine supply, a flat stationary port plate in the casing having openings communicating with said ports, said valve casing having also a hard water supply port with a communicating compartment, a flat valve member rotatable on the port plate and located in said compartment, an opening extending through the full thickness of the valve member and adapted upon rotation of the latter to successively establish communication between the hard water supply compartment and the port plate openings, and a recessed passage formed on the flat side of the valve member in contact with the port plate and being adapted to connect different combinations of port plate openings successively upon rotation of the valve member.

14. In zeolite water softening apparatus having a softening chamber and a source of brine supply, a multiway valve adapted to control the flow of liquid to and from the softening chamber, said valve comprising a casing having a plurality of ports connected respectively with top and bottom of the softening chamber, with a hard water supply pipe, with a soft water service pipe, with the source of brine supply and with a waste pipe, a valve member rotatable in the casing, a brine injector in the valve adapted to discharge into the top of the softening chamber, passages in the valve member adapted in a first position of the member to connect the hard water supply port with the softening chamber top port and to connect the softening chamber bottom port with the soft water service port, in a second position to connect the hard water supply port with the softening chamber bottom port and to connect the softening chamber top port with the waste port, in a third position to connect the hard water supply port to the brine injector and to connect the brine supply port with the injector and to connect the softening chamber bottom port with the waste conduit, said passages being adapted in a fourth position of the valve member to connect the hard water supply port to the softening chamber top port and to connect the softening chamber bottom port with the waste conduit, one complete revolution of the valve member from the first position back to the first position establishing the other three intermediate positions in succession and in the order named.

15. In the apparatus of claim 14, a flat face formed in the valve casing, the casing ports terminating in said flat face and the valve member being flat faced, and a flat plate interposed between the valve member and the flat face of the casing, said flat plate having openings therein adapted to establish the connections between the valve member passages and the casing ports.

16. In the apparatus of claim 14, a compartment in the valve casing having permanent communication with the hard water supply port, the valve member being located in said compartment and one of the passages in the valve member being an opening through the full thickness of the valve member adapted to establish communication through said hard water compartment for the hard water flow connections specified for the four positions of the valve member.

17. In zeolite water softening apparatus having a softening chamber and a source of brine supply, a multiway valve adapted to control the flow of liquid to and from the softening chamber, said valve comprising a casing having a plurality of ports connected respectively with top and bottom of the softening chamber, with a soft water service pipe, with a source of brine supply and with a waste pipe, an injector in the valve having a discharge communication with the top of the softening chamber, a flat stationary port plate in the casing having openings communicating with said ports and an opening communicating with said injector, said valve casing having also a hard water supply port with a communicating compartment, a flat rotatable valve member cooperating with the port plate and located in said compartment, an opening extending through the full thickness of the valve member and adapted upon rotation of said member to successively establish communication between the hard water supply compartment and different port plate openings, and a recessed passage formed on the flat side of the valve member facing the port plate and being adapted to connect different combinations of port plate openings successively upon rotation of the valve member, the injector being adapted upon flow of water therethrough to suck brine through the casing port connected to the source of brine supply.

ERIC PICK.